United States Patent
Patel et al.

(10) Patent No.: US 8,483,220 B2
(45) Date of Patent: *Jul. 9, 2013

(54) HANDLING OF RECEIVED IMPLICIT NULL PACKETS

(75) Inventors: Nirmesh Patel, Kanata (CA); Erel Ortacdag, Ottawa (CA)

(73) Assignee: Alcatel Lucent, Paris (FR)

(*) Notice: Subject to any disclaimer, the term of this patent is extended or adjusted under 35 U.S.C. 154(b) by 97 days.

This patent is subject to a terminal disclaimer.

(21) Appl. No.: 13/026,532

(22) Filed: Feb. 14, 2011

(65) Prior Publication Data

US 2011/0199922 A1    Aug. 18, 2011

Related U.S. Application Data

(63) Continuation of application No. 12/386,279, filed on Apr. 16, 2009, now Pat. No. 7,944,924.

(51) Int. Cl.
*H04L 12/56* (2006.01)
(52) U.S. Cl.
USPC .......................... 370/392; 370/400; 709/238
(58) Field of Classification Search
None
See application file for complete search history.

(56) References Cited

U.S. PATENT DOCUMENTS

| 6,526,056 | B1* | 2/2003 | Rekhter et al. | 370/392 |
|---|---|---|---|---|
| 6,603,756 | B1* | 8/2003 | Tappan | 370/351 |
| 7,944,924 | B2* | 5/2011 | Patel et al. | 370/392 |
| 2007/0076732 | A1* | 4/2007 | Kim | 370/409 |
| 2009/0141721 | A1* | 6/2009 | Filsfils | 370/392 |
| 2009/0168780 | A1* | 7/2009 | Unbehagen et al. | 370/392 |
| 2010/0080169 | A1* | 4/2010 | Berzin | 370/328 |

* cited by examiner

*Primary Examiner* — Brian Roberts
(74) *Attorney, Agent, or Firm* — Hitt Gaines, PC

(57) ABSTRACT

A router includes a network ingress processor and a network egress processor. The network ingress processor is configured for modifying a received MPLS packet such that an internal header thereof includes a pre-configured IP flow identifier therein in place of an as-received MPLS flow identifier. Such modifying is performed in response to the network ingress processor parsing a MPLS label stack of the received MPLS packet to determine if an existing MPLS label of the label stack needs to be replaced with an Implicit Null label and in response to determining that there is no other label in the MPLS label stack. The network egress processor includes a flow selector configured for directing packets dependent upon a type of flow identifier included in an internal header thereof, for receiving the modified MPLS packet, and for replacing the internal header with a port-specific header.

18 Claims, 4 Drawing Sheets

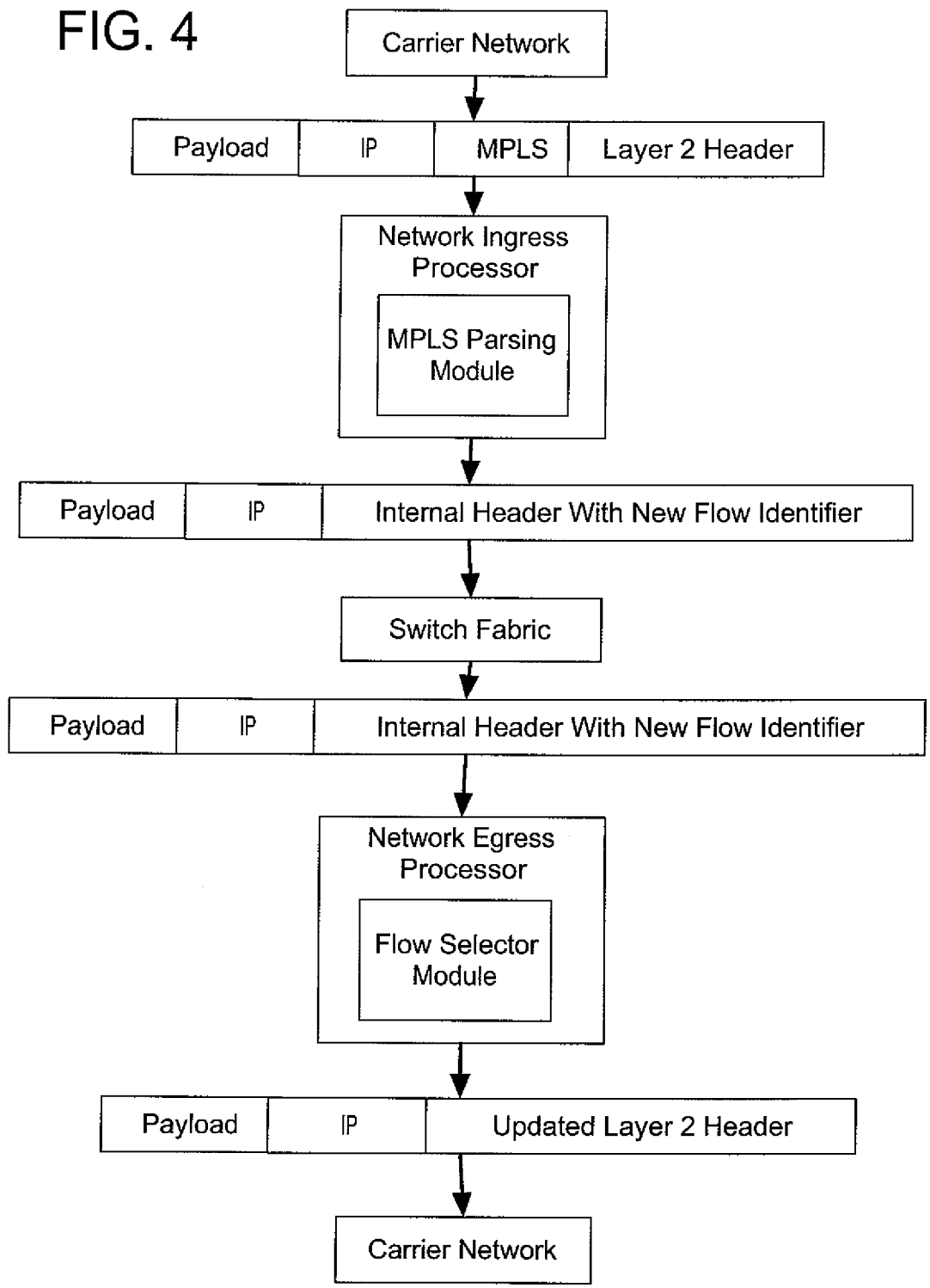

HANDLING OF RECEIVED IMPLICIT NULL PACKETS

CROSS REFERENCE TO RELATED APPLICATION

This Continuation patent application claims priority to U.S. Non-provisional patent application Ser. No. 12/386,279; filed Apr. 16, 2009 now U.S. Pat. No. 7,944,924 entitled 'Handling of Received Implicit Null Packets', which has a common applicant herewith and being incorporated herein in its entirety by reference.

FIELD OF THE DISCLOSURE

The disclosures made herein relate generally to distributed router architectures and, more particularly, to processing of Multiprotocol Label Switching (MPLS) packets that require implicit null handling in a distributed router architecture.

BACKGROUND

Multi-Protocol Label Switching (MPLS) is a packet-forwarding technology that uses labels to make data forwarding decisions. Each MPLS label is defined by a particular MPLS label value. MPLS labels having an MPLS label value of 3 are of particular importance to the discussions herein. More specifically, a MPLS label having a MPLS label value of 3 is a MPLS Implicit NULL label.

In an MPLS router, processing of an incoming implicit NULL packet (i.e., a packet having a MPLS label value of 3) requires updating different Layer 2 headers before transmitting the packet out of the router based on what is carried as the Layer 2 payload. Typical implementation in the distributed architecture of a router requires parsing the packet twice, first on ingress processing module and second on egress processing module.

Existing systems use separate hardware assist or a Field Programmable Gate Array (FPGA) module to perform update of the Layer 2 header. Such Layer 2 header update is performed by re-parsing the packet in the egress direction. However, hardware implementation is costly. Alternately, in a network processor based implementation, an egress packet parsing module can be implemented to update the Layer 2 header appropriately. However, this still incurs extra expense in the form of using extra packet parsing cycles in the network processor, thereby lowering the overall performance of the router.

Therefore, handling of received Implicit Null packets in a manner that precludes the need for re-parsing of such packets in the egress direction would be advantageous, desirable and useful.

SUMMARY OF THE DISCLOSURE

In a network of routers having a distributed architecture, different network processors of a router are used for ingress and egress processing of a common packet. Embodiments of the present invention eliminate extra processing cycles of such processors by precluding the need to parse packets in the egress direction (i.e., parsing by the network egress processor). In accordance with embodiments of the present invention, to process the MPLS packet that requires implicit NULL packet handling, only the ingress network processor parses such packets. More specifically, if an MPLS label is being swapped with an implicit NULL label, a check is performed by a network ingress processor of a router to determine if there are any other labels in the MPLS stack. If the MPLS label being swapped is the last label in the MPLS label stack, the internal header of the packet is modified to include a new flow identifier. For example, the internal header is replaced with an internal header having an Internet Protocol (IP) flow identifier (i.e., a flow identifier that identifies the packet as needed to be forwarded from a router via IP communication standard). A flow selector of an egress router identifier is pre-configured for causing the network egress processor to append a different Layer 2 header (i.e., port-specific Layer 2 header) onto the packet, therefore avoiding the need to reparse the MPLS packet at the network egress processor.

In one embodiment of the present invention, a method comprises a plurality of operations. A network ingress processor performs an operation for parsing an MPLS label stack of a received MPLS packet to determine if an existing MPLS label of a MPLS label stack of the received MPLS packet needs to be replaced with an Implicit Null label. The network ingress processor performs an operation for removing the existing MPLS label and checking to determine if there is any other MPLS label in the MPLS label stack. Such removing and checking are performed in response to the network ingress processor determining that replacement of the existing MPLS label of the existing MPLS label with the Implicit Null label is required. The network ingress processor performs an operation for providing the received packet with an internal header including a pre-configured IP flow identifier and thereafter sending the packet to a network egress processor in response to the network ingress processor determining that there is no other MPLS label in the MPLS label stack. A flow selecting portion of the network egress processor performs an operation for selecting routing parameters for the packet in response to the network egress processor receiving the packet and recognizing the pre-configured IP flow identifier. The network egress processor performs an operation for providing the received MPLS packet with an updated Layer 2 header configured dependent upon at least one physical network parameter related to network infrastructure over which the packet is transmitted from the network egress processor.

In another embodiment of the present invention, a network has a plurality of routers distributed therein. A first one of the routers includes a network ingress processor configured for modifying a received MPLS packet such that an internal header thereof includes a pre-configured IP flow identifier therein in place of an as-received MPLS flow identifier. Such modifying is performed in response to the network ingress processor parsing a MPLS label stack of the received MPLS packet to determine if an existing MPLS label of the label stack needs to be replaced with an Implicit Null label and in response to determining that there is no other label in the MPLS label stack. A second one of the routers includes a network egress processor having a flow selector configured for directing packets dependent upon a type of flow identifier included in an internal header of a packet and for replacing the internal header with a port-specific Layer 2 header in response to determining that the modified MPLS packet includes the pre-configured IP flow identifier within its internal header.

In another embodiment of the present invention, a routing apparatus comprising a network ingress processor and a network egress processor. The network ingress processor is configured for modifying a received MPLS packet such that an internal header thereof includes a pre-configured IP flow identifier therein in place of an as-received MPLS flow identifier. Such modifying is performed in response to the network ingress processor parsing the MPLS label stack of the received MPLS packet to determine if an existing MPLS label of the label stack needs to be replaced with an Implicit Null label and in response to determining that there is no other label in the MPLS label stack. The network egress processor has a flow selector configured for directing packets dependent upon a type of flow identifier included in an internal header of a packet and for replacing the internal header with a port-specific Layer 2 header in response to determining that the modified MPLS packet includes the pre-configured IP flow identifier within its internal header.

In another embodiment of the present invention, a routing apparatus comprises a network ingress processor configured for modifying a received MPLS packet such that an internal header thereof includes a pre-configured IP flow identifier therein in place of an as-received MPLS flow identifier. Such modifying is performed in response to the network ingress processor parsing a MPLS label stack of the received MPLS packet to determine if an existing MPLS label of the label stack needs to be replaced with an Implicit Null label and in response to determining that there is no other label in the MPLS label stack.

In another embodiment of the present invention, a routing apparatus comprises a network egress processor having a flow selector configured for directing packets dependent upon a type of flow identifier included in an internal header of a packet and for replacing the internal header with a port-specific Layer 2 header in response to determining that the modified MPLS packet includes a pre-configured IP flow identifier within its internal header. The pre-configured IP flow identifier is in place of an as-received MPLS flow identifier of the packet.

Any MPLS router supporting implicit NULL label processing and using distributed ingress and egress architecture may benefit through incorporation of routers (i.e., routing apparatuses) configured in accordance with the present invention. Alternatively, invention to avoid extra circuitry, it is disclosed herein that hardware-based implementation can also be configured in accordance with the present.

These and other objects, embodiments, advantages and/or distinctions of the present invention will become readily apparent upon further review of the following specification, associated drawings and appended claims.

BRIEF DESCRIPTION OF THE DRAWINGS

FIG. 4 show a diagrammatic flow representation of an implicit null packet handling process configured in accordance with the present invention.

DETAILED DESCRIPTION OF THE DRAWING FIGURES

Figure 1:
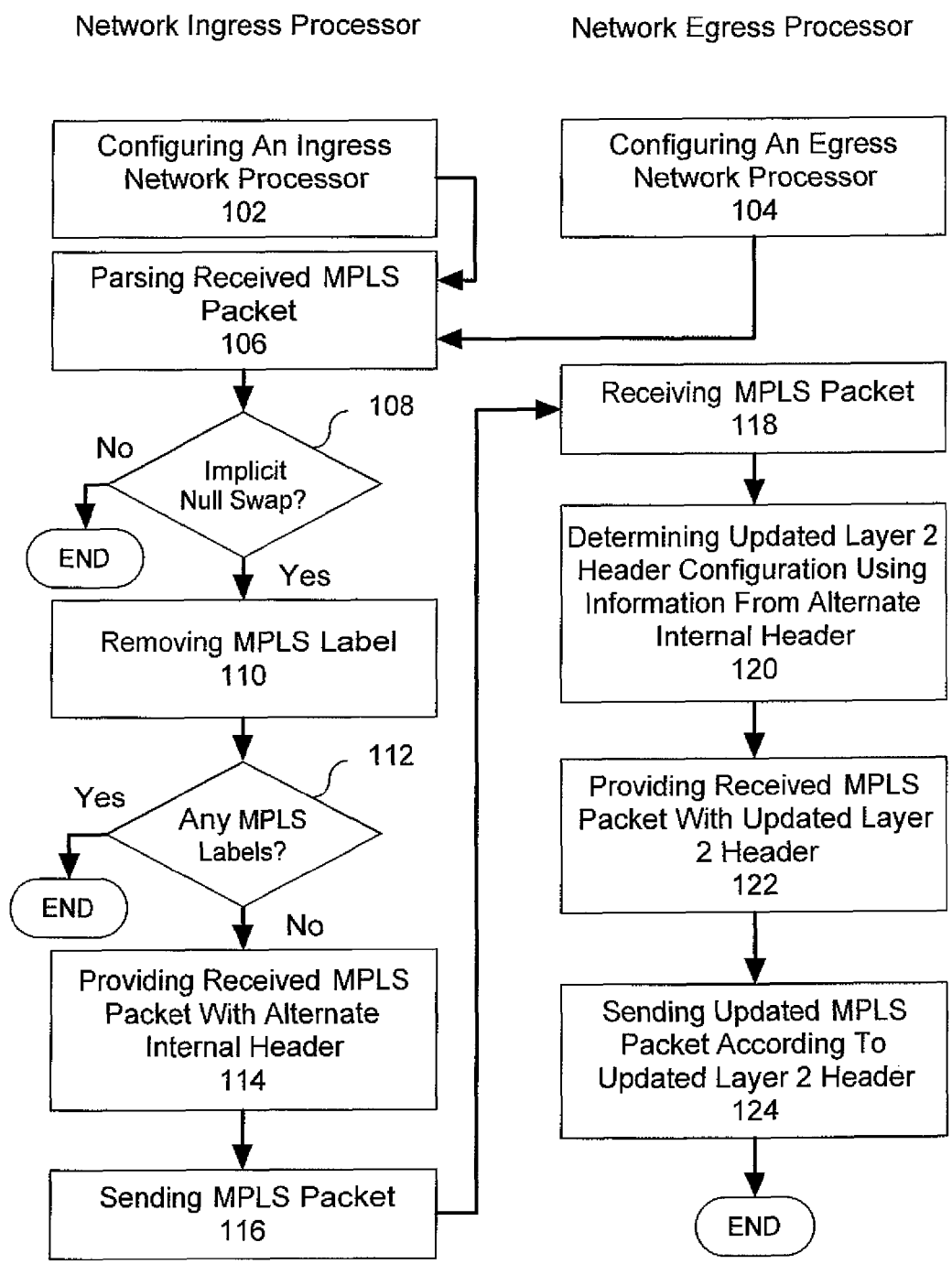
FIG. 1 shows a method configured in accordance with an embodiment of the present invention.

Referring now to FIG. 1, a method 100 configured in accordance with an embodiment of the present invention for handling received Implicit Null packets is shown. The method 100 can be practiced by a router having a distributed architecture whereby such a distributed architecture relies upon different network processors of a router being used for ingress and egress processing of a common packet. Advantageously, the method 100 eliminates extra processing cycles of such processors by precluding the need to parse packets in the egress direction (i.e., parsing by the network egress processor). To this end, the method 100 processes MPLS packets that require implicit NULL packet handling in such a manner that only the network ingress processor parses the packet.

The method 100 begins with an operation 102 being performed for configuring a network ingress processor of a router and an operation 104 being performed for configuring a network egress processor of a router (e.g., the network processors being of a same or different router). It is disclosed herein that, in a typical deployment of routers in a network, all of the routers will have their network ingress processor and network egress processor configured in accordance with the present invention (e.g., as disclosed below).

Configuration of the network ingress processor includes providing information (e.g., instructions and parameters) for causing an alternative header to be used instead of the original header to be placed in front of the packet if a packet required Implicit null label swapping and a MPLS label at the top of the MPLS label stack is the last label in the stack (i.e., the MPLS swap label). The original header contains a MPLS flow identifier and the alternative header contains a pre-configured IP flow identifier (i.e., a flow identifier having known and intended packet routing parameters). For example, the IP flow identifier is assigned an integer of 100 and the MPLS flow identifier is assigned an integer of 101 such that IP and MPLS traffic flows are uniquely identifiable. Configuration of the network egress processor includes the network egress processor being programmed with two different flow selecting portions. A first flow selecting portion is configured to forward IP packets (i.e., IP flow selector) and a second flow selecting portion is configured to forward MPLS packets (i.e., MPLS flow selector). The two different flow selecting portions can each be a discrete flow selector or can be different portions of a common flow selector (e.g., a flow selector module).

The IP flow selecting portion is configured to append a Layer 2 header to an IP packet (i.e., packet having IP payload) based on the physical medium used for transmitting such IP packet. For example, if an IP packet is traversing through Ethernet port, the IP flow selecting portion adds an Ethernet header specifying IP as a payload. If the IP packet is traversing through PPP/MLPPP ports, the IP flow selecting portion adds a PPP header specifying IP as a payload. Similarly, the MPLS flow selecting portion is configured to append a Layer 2 header to a MPLS packet based on the physical medium used for transmitting such MPLS packet. For example, if a MPLS packet is traversing through an Ethernet port, the MPLS flow selecting portion adds an Ethernet header specifying MPLS as a payload. If the MPLS packet is traversing through PPP/MLPPP ports, the MPLS flow selecting portion adds a PPP header specifying MPLS as a payload.

In the case where implicit NULL swap is performed for a MPLS packet and there are no more MPLS labels in the MPLS label stack, the packet is provided (e.g., sent, transmitted or the like) to the IP flow selector configured on the network egress processor. For all other cases, the MPLS packet is sent to MPLS flow selector configured on the network egress processor. A network administrator using a suitable utility or application (e.g., that of a network management system) can perform such configuration.

It is disclosed herein that the first and second flow selectors can be respective portions of a single flow selector module. It is also disclosed herein that such configuring can be performed for a network ingress processor and a network egress processor of each router in a network. Accordingly, a network ingress processor of a first router configured in such a manner will be able to forward (i.e., route) packets in conjunction with a network egress processor of the first router or a network egress processor of another router so configured and a network egress processor of the first router will be able to forward (i.e., route) packets in conjunction with the network ingress processor of first router or a network ingress processor of another router so configured.

After the ingress and network egress processor are appropriately configured, the network ingress processor performs an operation 106 for parsing an MPLS label stack of a received MPLS packet to determine if an existing MPLS label of a MPLS label stack of the received MPLS packet needs to be replaced with an Implicit Null label. In response to the network ingress processor performing an operation 108 for determining whether replacement of the existing MPLS label of the existing MPLS label with an Implicit Null label is required. If it is determined that such replacement is not necessary, the method 100 ends and processing of the packet continues with a different method (e.g., in accordance with prior art packet processing). If it is determined that such replacement is necessary, the network ingress processor performs an operation 110 for removing the existing MPLS label that is being swapped (i.e., label on top of MPLS label stack) and then performs an operation 112 for determining if there is any other MPLS label in the MPLS label stack (i.e., the last label in the MPLS label stack). For example, a MPLS label is the last of the MPLS label stack if such label has a Bottom of Stack Bit set (i.e., also known as S-bit, see section 2.1 of Request For Comments (RFC) no. 3032 (i.e., RFC3032) entitled "MPLS Label Stack Encoding"). Such a last label can be visualized as innermost label in the MPLS label stack.

If it is determined that the MPLS label is not the last label in the MPLS label stack, the method 100 ends and processing of the packet continues with a different method (e.g., in accordance with prior art packet processing). In the case where such replacement is necessary and it is determined that there is not any other MPLS label in the MPLS label stack, the network ingress processor performs an operation 114 for providing the received packet with an internal header including a pre-configured IP flow identifier (i.e., IP-specific header) and thereafter performs an operation 116 for sending the packet to the network egress processor. The pre-configured flow identifier identifies the packet as requiring egress forwarding (i.e., transmission) via IP communication standard. In one embodiment, providing the received packet with the internal header including the pre-configured IP flow identifier includes appending a new header on the packet. In another embodiment, providing the received packet with the internal header including the pre-configured IP flow identifier includes modifying an existing header. Accordingly, it is disclosed herein that the present invention in not unnecessarily limited to such providing being carried out in one specific manner.

After the network egress processor performs an operation 118 for receiving the packet, an IP flow selecting portion of the network egress processor performs an operation 120 for determining (e.g., selecting) configuration of a Layer 2 header to be appended to the packet. A Layer 2 header is one example of a type of header than can be configured and appended/provided by a method in accordance with the present invention. In view of the IP-specific header provided by the network ingress processor, the packet is directed to the IP flow selecting portion of the network egress processor as opposed to the MPLS flow selecting portion of the network egress processor. More specifically, the IP flow selecting portion of the network egress processor is configured (e.g., programmed) to recognize the IP flow identifier, thereby causing the IP flow selecting portion of the network egress processor to process the packet. After determining the configuration of the Layer 2 header, the network egress processor performs an operation 122 for providing the packet with a Layer 2 header whose configuration was determined at the operation 120 above. The Layer 2 header provided to the packet is configured dependent upon one or more physical network parameters related to network infrastructure over which the packet is transmitted from the network egress processor (e.g., a physical network parameter such as a type of port). In one embodiment, such providing can include appending an updated header to the packet. In another embodiment, such providing can include replacing an internal header of the packet with an updated header.

As such, it can be seen that the method 100 precludes the need for the network egress processor to reparse the packet. Specifically, this is because the IP flow identifier and IP flow selecting portion of the network egress processor are jointly configured for processing only IP packets. Accordingly, there is no need to reparse a packet at the network egress processor to determine whether a protocol of the packet is IP or MPLS. In other words, only the network ingress processor of a router receiving the packet parses the packet (i.e., received MPLS packet) and thereafter chooses to associate the IP flow identifier or the MPLS flow identifier with the packet. In view of the configuration of the flow selecting portion(s) of the network egress processor at a router that will be forwarding the packet, the network egress processor does not need to reparse the packet to determine whether a protocol of the packet is IP or MPLS.

Figure 2:
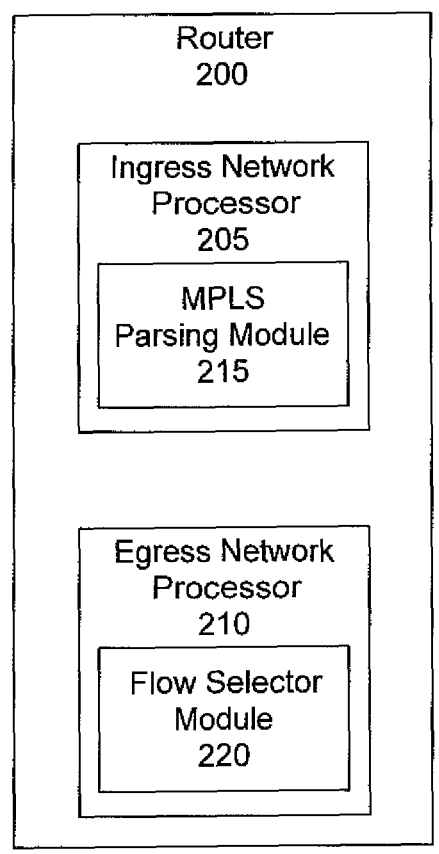
FIG. 2 shows a router configured in accordance with an embodiment of the present invention.

FIG. 2 shows a router 200 configured in accordance with the present invention. The router 200 includes a network ingress processor 205 and a network egress processor 210, which are jointly configured for carrying out Implicit Null packet handing functionality in accordance with the present invention (e.g., in accordance with the method 100 disclosed above). The network ingress processor 205 is configured for modifying a received MPLS packet such that an internal header thereof includes a pre-configured IP flow identifier therein in place of an as-received MPLS flow identifier. Such modifying is performed in response to the network ingress processor parsing a MPLS label stack of the received MPLS packet to determine if an existing MPLS label of the label stack needs to be replaced with an Implicit Null label and in response to determining that there is no other label in the MPLS label stack. The network egress processor 210 is configured for directing packets dependent upon a type of flow identifier included in an internal header of a packet, for receiving the modified MPLS packet (i.e., as modified by the network ingress processor), and for replacing the internal header with a port-specific Layer 2 header in response to determining that the modified MPLS packet includes the pre-configured IP flow identifier within a header thereof. In one embodiment (shown), a MPLS parsing module 215 is configured for providing Implicit Null packet handing functionality in accordance with the present invention (e.g., operations 106-116 of the method 100) and a flow selector 220 is configured for providing egress packet handling functionality in accordance with the present invention (e.g., operations 118-124 of the method 100).

In one embodiment, a router configured in accordance with the present invention includes an ingress traffic interface, an egress traffic interface, memory, and one or more data processing devices (i.e., processors). The ingress traffic interface is configured for being coupled to a network node than forwards protocol data units (PDUs) such as, for example, packets to the router. The egress traffic interface is configured for being coupled to a network node than receives protocol data units (PDUs) such as, for example, packets to the router. The memory has instructions stored thereon and accessible there-from. The one or more processors are configured for accessing and interpreting the instructions thereby performing functionality defined by such instructions. The one or more processors are coupled to the interfaces for enabling communication between the one or more processors and network nodes connected to the interfaces. In one embodiment, the instructions are configured for carrying out the method 100 discussed above such that for a given packet, the router performs Implicit Null packet handing functionality in accordance with the present invention (e.g., operations 106-116 of the method 100) or egress packet handling functionality in accordance with the present invention (e.g., operations 118-124 of the method 100).

It is disclosed herein that the piece of hardware commonly referred to in the industry as a router is one example of a routing apparatus. Other examples of routing apparatuses can include, but are not limited to, switches, bridges, and the like. Accordingly, it is disclosed herein that implicit Null packet handling functionality in accordance with the present invention can be carried out by various types of apparatuses that are configured for routing protocol data units (PDUs).

Figure 3:
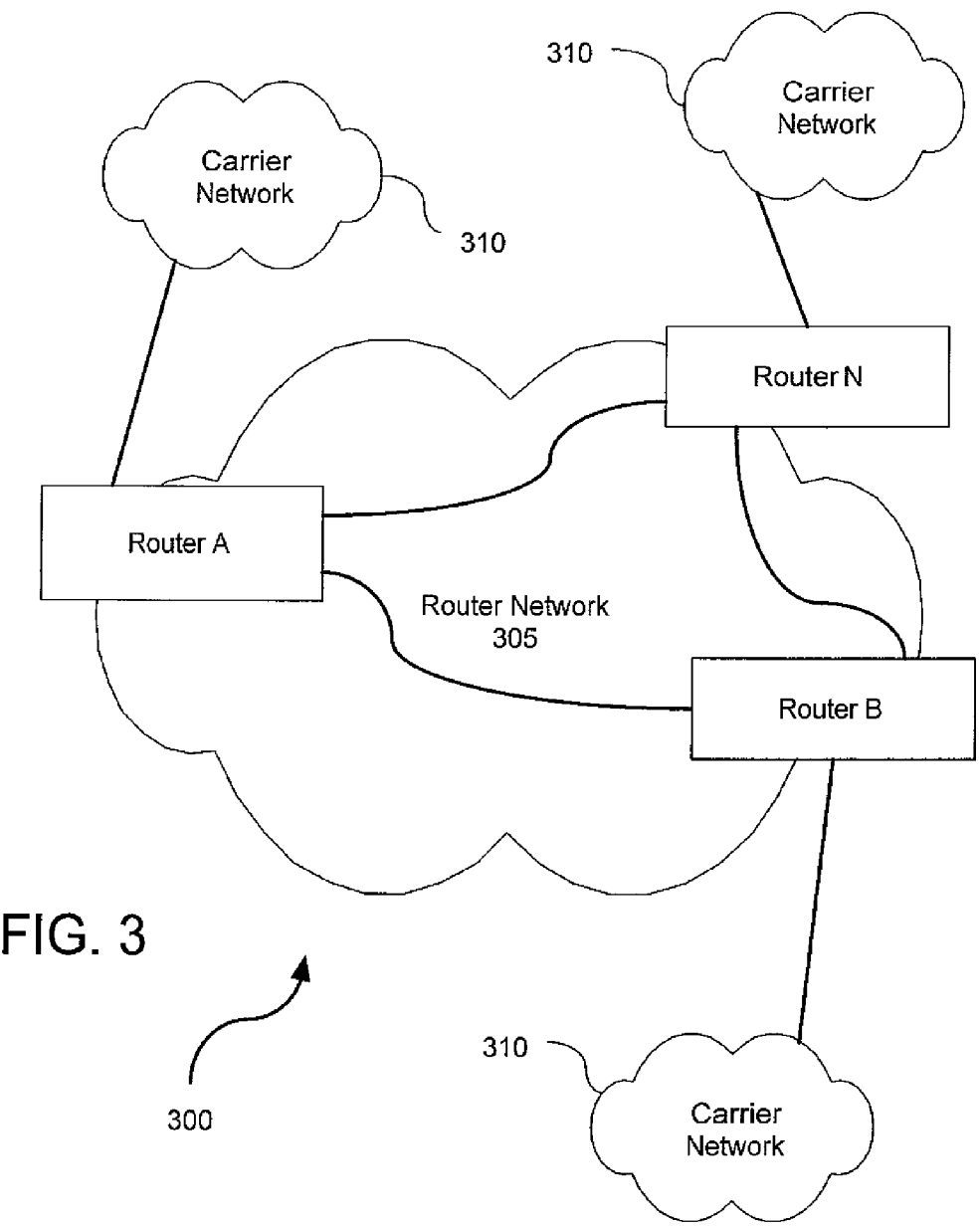
FIG. 3 shows a network of routers configured in accordance with an embodiment of the present invention.

FIG. 3 shows a network 300 configured in accordance with the present invention. The network system includes a router network 305 having one or more carrier networks 310 connected thereto. The router network 305 is connected to the one or more carrier networks 310 through a plurality of distributed architecture routers (Router A, Router B, Router N) that are each configured in accordance with the present invention for providing Implicit Null packet handling functionality in accordance with the present invention (e.g., the router 200 of FIG. 2). The plurality of routers (Router A, Router 13, Router N) are interconnected in a networked manner such that packets can be received from a carrier network (or other type of network) by one router (i.e., network ingress router) and forwarded to a carrier network (or other type of network) by the same or another one of the routers (i.e., network egress router). Each one of the routers (Router A, Router B, Router N) are configured for providing Implicit Null packet handling functionality in accordance with the present invention and for providing egress packet handling functionality in accordance with the present invention.

FIG. 4 show a diagrammatic flow representation of an implicit null packet handling process configured in accordance with the present invention. A packet (i.e., a MPLS packet) is received from a carrier network by a network ingress processor. A MPLS parsing module of the network ingress processor parses the packet and modifies a header of the packet to include a new flow identifier (e.g., the IP flow identifier discussed above). The packet is then forwarded to a network egress processor through a switch fabric (i.e., of a router network). A flow selector of the network egress processor recognizes the new flow identifier and provides the packet with an updated Layer 2 header. Preferably, but not necessarily, the updated Layer 2 header is a port-specific Layer 2 header configured in accordance with a type of port over which the packet is transmitted from the network egress processor.

Referring now to instructions processible by a data processing device, it will be understood from the disclosures made herein that methods, processes and/or operations adapted for carrying out Implicit Null packet handling functionality as disclosed herein are tangibly embodied by computer readable medium having instructions thereon that are configured for carrying out such functionality. In one specific embodiment, the instructions are tangibly embodied for carrying out the method 100 disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., instructions) adapted for carrying out Implicit Null packet handling functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method, comprising:
a network ingress processor parsing an Multi-Protocol Label Switching (MPLS) label stack of a received MPLS packet to determine if an existing MPLS label of the MPLS label stack of the received MPLS packet needs to be replaced with an Implicit Null label;
the network ingress processor checking to determine if there is any other MPLS label in the MPLS label stack, wherein said checking is performed in response to the network ingress processor determining that replacement of the existing MPLS label of the existing MPLS label with the Implicit Null label is required;
the network ingress processor providing the received MPLS packet with an internal header including a pre-configured Internet Protocol (IP) flow identifier and thereafter sending said packet to a network egress processor in response to the network ingress processor determining that there is no other MPLS label in the MPLS label stack.

2. The method of claim 1 wherein:
the pre-configured IP flow identifier provides information causing a Layer 2 header configured in accordance with a type of port over which said received MPLS packet is transmitted from a routing apparatus comprising the network egress processor to be appended to the received MPLS packet.

3. The method of claim 2, further comprising:
providing the network ingress processor with information defining the pre-configured IP flow identifier prior to the network ingress processor performing said parsing.

4. The method of claim 1, further comprising:
providing the network ingress processor with information defining the pre-configured IP flow identifier prior to the network ingress processor performing said parsing.

5. A network having a plurality of distributed architecture routers therein, comprising:
at least a first one of said plurality of distributed architecture routers configured for modifying a received Multi- Protocol Label Switching (MPLS) packet such that an internal header thereof includes a pre-configured Internet Protocol (IP) flow identifier therein in place of an as-received MPLS flow identifier, wherein said modifying is performed in response to the network ingress processor parsing a MPLS label stack of the received MPLS packet to determine if an existing MPLS label of the MPLS label stack needs to be replaced with an Implicit Null label and in response to determining that there is no other label in the MPLS label stack.

6. The network of claim 5 wherein the pre-configured IP flow identifier information causing a Layer 2 header configured in accordance with a type of port over which said received MPLS packet is transmitted from a second one of said plurality of distributed architecture routers to be appended to said received MPLS packet.

7. The network of claim 6 wherein the first one of said plurality of distributed architecture routers includes information stored thereon that defines the pre-configured IP flow identifier.

8. The network of claim 5 wherein the first one of said plurality of distributed architecture routers includes information stored thereon that defines the pre-configured IP flow identifier.

9. The network of claim 5, wherein the first one of said plurality of distributed architecture routers is further configured to provide the MPLS packet with a port-specific Layer 2 header dependent on the IP flow identifier.

10. The network of claim 9, wherein the first one of said plurality of distributed architecture routers is further configured to select routing parameters for the MPLS packet dependent upon the IP flow identifier.

11. A routing apparatus, comprising:
a network ingress processor configured for modifying a received Multi-Protocol Label Switching (MPLS) packet such that an internal header thereof includes a Internet Protocol (IP) flow identifier therein in place of an as-received MPLS flow identifier, wherein said modifying is performed in response to the network ingress processor parsing a MPLS label stack of the received MPLS packet to determine if an existing MPLS label of the MPLS label stack needs to be replaced with an Implicit Null label.

12. The routing apparatus of claim 11 wherein the IP flow identifier provides information causing a Layer 2 header configured in accordance with a type of port over which the packet is transmitted from the routing apparatus to be appended to the received MPLS packet.

13. The routing apparatus of claim 12 wherein the network ingress processor includes information stored thereon that defines the IP flow identifier.

14. The routing apparatus of claim 11 wherein the network ingress processor includes information stored thereon that defines the IP flow identifier.

15. A routing apparatus, comprising:
a network egress processor having a flow selector configured for replacing an internal header of a Multi-Protocol Label Switching (MPLS) with a port-specific Layer 2 header in response to determining that said modified MPLS packet includes an Internet Protocol (IP) flow identifier within its internal header, wherein the IP flow identifier is in place of an as-received MPLS flow identifier of said MPLS packet.

16. The routing apparatus of claim 15 wherein:
said replacing includes selecting routing parameters for said MPLS packet dependent upon the IP flow identifier.

17. The routing apparatus of claim 16 wherein said selecting includes determining that the internal header of said MPLS packet includes the IP flow identifier.

18. The routing apparatus of claim 17 wherein the port-specific Layer 2 header is configured in accordance with a type of port over which said MPLS packet is transmitted from the routing apparatus.

* * * * *